Dec. 21, 1954     C. W. GLESNER     2,697,738
DRY CELL
Filed March 27, 1953

INVENTOR.
Charles W. Glesner
BY
Griswold & Burdick
ATTORNEYS

# United States Patent Office 2,697,738
Patented Dec. 21, 1954

2,697,738

DRY CELL

Charles W. Glesner, Midland, Mich., assignor to The Dow Chemical Company, Midland, Mich., a corporation of Delaware Application March 27, 1953, Serial No. 344,990

1 Claim. (Cl. 136—177)

The invention relates to an improved primary cell of the dry or nonspillable type. It more particularly concerns primary cells of the foregoing type, the anode material of which is magnesium.

Dry cell formulations employing magnesium as the anode material are disclosed in a paper by R. C. Kirk and A. B. Fry, "Magnesium dry cells," published in the "Journal of the Electrochemical Society," vol. 94, No. 6, December 1948, pages 277 to 289, inclusive. In making up these cells, as mentioned in U. S. Patent 2,616,940, "the usual procedure is to form the anode material into a cup or 'battery can' which constitutes one of the electrodes of the cell as well as the container holding the cathode elements and electrolyte. The cathode mix consists of manganese dioxide having intimately mixed with it usually between about 5 and 15 per cent of finely-divided carbon, such as acetylene black, by weight. The mixture is moistened with enough electrolyte to make it moldable and the moldable mixture is formed into 'bobbins' around a central electrode in the form of a rod or carbon or graphite. These bobbins are simply cylindrical moldings somewhat smaller than the battery can and are inserted into the cans after they are lined with starch paste or gelled electrolyte or a porous nonconductor, such as cloth or paper, to keep the bobbin from touching the can. In some instances, the cathode mix is introduced into the lined cans without previously forming the mix into a bobbin, the molding taking place in the lined can. In such instances, after placing the cathode mix in the can, the electrode of a carbon or graphite rod is pushed centrally into the cathode mix as the other electrode." Similar dry cell formulations are disclosed in U. S. Patents 2,547,907 and 2,547,908. U. S. Patent 2,616,940 discloses that in the cells having the foregoing formulations the can or cup lining may be dispensed with and the cathode mix may be placed directly against the inside of the can or cup in assembling the cell elements.

Dry cells formulated as above described (with or without lining the can) are usually sealed at the top by placing a cardboard or similar porous dielectric washer in the top of the can over the end of the carbon rod a short distance above the cathode mix and then a layer of sealing compound, such as a rosin-base sealing wax, coal tar or asphalt pitch, is poured over the washer so as to fill the annular space at the top of the can above the washer.

One of the difficulties with cells having magnesium as the anode material and constructed as described is the problem of providing adequate venting of the hydrogen which is formed as the cell discharges. The rate of hydrogen evolution may reach as high as 23.44 cc. per minute for flashlight size (D) cells when short circuited. At usual current drains, the rate of hydrogen evolution in a D-size cell, for example, may be from about 0.5 to 4.5 cc. per minute. If the cell is not vented either the sealing compound will be cracked or forced out of the cell or the cell will bulge and leak due to the high gas pressure generated within the cell. If the sealing compond becomes cracked or breaks away from the wall of the can so that the hydrogen can escape excessive loss of moisture occurs which adversely affects the capacity and performance of the cell and generally lowers the voltage of the cell. The simple expedient of drilling a hole through the sealing compound to thereby provide a vent is open to the same objections. Other devices, such as partially sealed steel cell jackets which provide venting and prevent leakage and bulging, are difficult and expensive to produce. Insofar as I am aware, there is no satisfactory commercially available venting of dry cells employing magnesium as the anode material.

According to the present invention, a simplifying departure is made in the sealing of the cell which overcomes the foregoing difficulties in that a cell closure is provided which allows adequate venting of hydrogen without excessive moisture loss and is simply and easily installed without elaborate machinery. The invention is based upon the principal of molding the sealing compound around a piece of a porous dielectric material extending through the sealing compound as a tab or extension of the dielectric washer, conventionally used in the top of the cell below the sealing compound, so that the tab forms a gas permeable passageway through the sealing compound, the tab being permeable to hydrogen but not excessively permeable to water vapor.

The tab may have a variety of forms, the one preferred being formed by making a pair of parallel cuts a short distance apart through the face of the dielectric washer and extending inwardly from the edge and then bending the resulting free portion of the washer upwardly as a tab. Other tabs integral with the washer may be made in similar manner as by punching out a tab from the face of the washer between its margins or by forming the washer and tab as a one-piece punching from a sheet of porous dielectric material with the tab integral with the periphery of the washer.

A washer formed with a tab integrally therewith as described is then threaded over the upper end of the carbon electrode (embedded in the cathode mix in the can or cup) and fitted into the annular space between the inside of the can and the carbon electrode with the tab upstanding. The washer so-disposed should be a short distance above the cathode mix or bobbin so as not to be in contact with it but sufficiently below the rim of the cup or can to permit a generous fill of sealing compound to be molded on top of the washer and encircle both the carbon electrode and the tab. Except in those instances where the tab is an extension of the periphery of the washer, it is necessary to provide a second washer or other suitable stopping means underneath the washer having the integral tab so as to prevent the sealing compound from running through the opening in the washer left in forming the tab when it is cut out of the face of the washer. The second washer is made of a porous dielectric material similar to that of the tabbed washer so that gas produced in the cell may pass through it to the venting tab.

The invention may be further explained and illustrated in connection with the accompanying drawing showing various embodiments of the invention.

In the said drawing.

Figure 3:
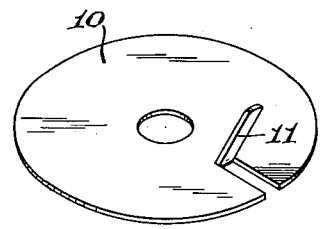
Fig. 3 is an isometric view of the washer of the cell of Fig. 1.

Referring to the drawing in detail, the dry cell shown comprises the cup or can 1 formed of magnesium or a magnesium-base alloy. The cup has a bibulus lining, e. g. paper 2. The cup or can 1 contains the cathode mixture 3 moistened with aqueous electrolyte and in the mixture is embedded the carbon electrode 4 the upper end 5 of which projects above the rim 6 of the can. Suitable formulations of electrolytes and cathode mixes of dry cells employing magnesium as the anode material for use with the invention are disclosed in the aforementioned U. S. Patents 2,547,907, 2,547,908, 2,616,940, and paper by Kirk and Fry. A short distance above the top 7 of the cathode mix is placed a washer 8 which fits tightly over the carbon electrode and the inside 9 of the can. This washer is made of a porous dielectric material, such as cardboard, and serves to center the electrode as well as to provide a closure for the annular space between the inside 9 of the can and the upper end 5 of the carbon electrode. Superimposed upon washer 8 is washer 10 having a venting tab 11 formed integrally therewith as shown in detail in Fig. 3 with the venting tab in the upstanding position. The electrode 5 may be provided with a metal terminal cap 12. After placing the dielectric washers in position as shown, molten sealing compound 13, e. g. coal tar pitch, is poured on the top of washer 10 so as to seal the top of the can by filling the space above the washer 10 up to the rim 6 of the can. The sealing compound adheres to the inside of the top of the can or cup and encircles the top 5 of the carbon electrode and the portion 14 of the tab 11 intermediate its ends. In this way, the cell is completely sealed, except for the vent tab 11 through the pores of which hydrogen, which accumulates in the space 15 as the cell operates, may escape.

Figure 1:
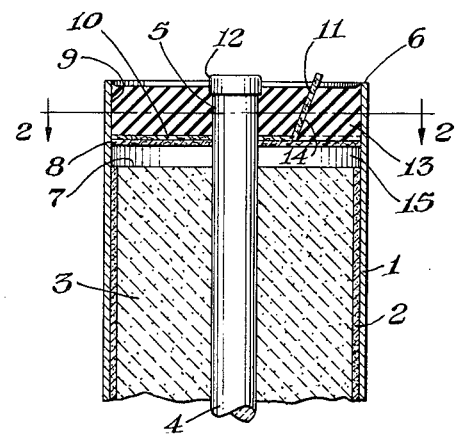
Fig. 1 is a fragmentary vertical section of a dry cell showing the top portion involving one form of the venting feature of the invention.
Figure 2:
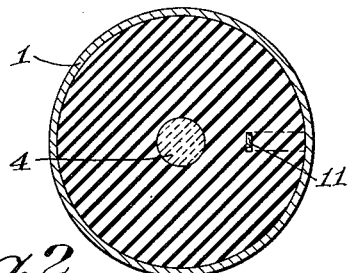
Fig. 2 is a cross section taken on the line 2—2 of Fig. 1.
Figure 5:
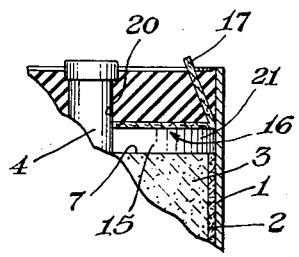
Fig. 5 is a fragmentary cross-sectional view of a dry cell embodying the washer of Fig. 4.
Figure 4:
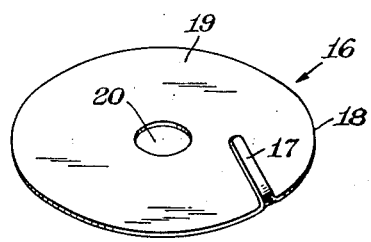
Fig. 4 is an isometric view of a modification of the washer showing the venting tab as an extension of the periphery of the washer.

In the modification shown in Figs. 4 and 5, the elements of the cell are the same as those of Fig. 1 but the washer 16 is formed with an integral vent tab 17 as an extension of the periphery 18 of the washer body 19. A central opening 20 is provided to admit the upper end of the carbon electrode and a space 21 is left between the washer body 19 and the top 7 of the cathode mix 3. With this modification, a second washer, e. g. 8 of Fig. 1, need not be employed as a support for the sealing compound.

Figure 6:
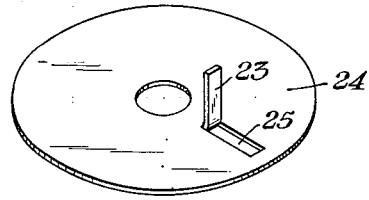
Fig. 6 is a further modification of the washer embodying an integral venting tab.

In the modification shown in Fig. 6, the venting tab 23 is punched out of the body portion 24 of the washer leaving an opening 25 which must be closed before the sealing compound is applied. This closing may be effected in the same manner as that shown in Fig. 1 in assembling cells with this washer. In such assembly, an imperforate washer, e. g. 8, of porous dielectric material, e. g. cardboard, is used beneath the washer 24 so that there will be an imperforate washer below the opening 25.

The size of the vent tab should be neither too small nor too large. If too small either the can tends to bulge or the seal may be broken by gas pressure developed in the cell. If the vent tab is too large, there will be evidence of this in the form of excessive moisture loss. The proper size of tab lies between these extremes and may be ascertained by trial. As a general rule as to size, the tab may have a cross section of about 1 per cent of the area of the top of the can of conventional cylindrical or rectangular construction. In D- and F-size cells, cardboard washers having a thickness of 0.31 inch have been used satisfactorily with tabs of $\frac{1}{16}$ to $\frac{1}{4}$ of an inch in width formed integrally with the washer. A tab having a width of $\frac{1}{16}$ inch and thickness of 0.31 inch will vent hydrogen at the rate of 6 cc. per minute at a pressure of 1 pound per square inch and 91.3 cc. per minute at 25 pounds pressure per square inch.

As illustrative of the invention, dry cells made up in accordance with the invention were submitted to various venting tests. These test cells employed a cathode mix of 91 per cent of manganese dioxide, 3 per cent of barium chromate, and 6 per cent of acetylene black moistened with electrolyte in the proportion of 300 cc. of electrolyte per 1000 grams of the dry mix. The electrolyte was composed of the water solution formed of 250 grams of magnesium bromide and 0.2 gram of sodium chromate per liter of solution. The cans were of D-size drawn from a magnesium-base alloy composed of 1 per cent aluminum, $\frac{1}{2}$ per cent zinc, the balance being magnesium. The top of the cans were closed with cardboard washers having integral venting tabs $\frac{1}{16}$ inch wide and 0.31 inch thick, the top of the cans being sealed with asphalt tar. Cells so-formulated and put on the shelf for 5 months at room temperature, without external current drain, showed a weight loss on the average (9 cells) of but 0.0367 gram and the open circuit voltage on the average at the end of the storage period was 1.74 volts. A batch of 9 D-size conventional dry cells was made up in the same way except that in each cell a plain washer was sealed in place without a vent tab and tested in similar manner for comparison. After 5 months of storage $\frac{1}{3}$ of the batch of the 9 cells had bulged due to gas pressure. In another series of tests, D-size cells were made using the same magnesium-base alloy, cathode mix, and electrolyte as in the foregoing batches and sealed in accordance with the invention with a rosin-base wax which was cast around a cardboard venting tab formed as in Fig. 3, $\frac{1}{16}$ inch wide and 0.31 inch thick in cross section as a tab of the washer. Three of these cells were discharged through a 5 ohm resistance continuously for 24 hours. By that time, the cells were in satisfactory condition as to the top seal which showed no signs of failure nor did the cells show any sign of bulging. Duplicate cells similarly made and sealed but without a vent tab failed, on being similarly discharged continuously through 5 ohms, by either blowing out the seal or bulging of the cell can.

I claim:

A primary cell comprising a magnesium cup anode, a carbon cathode disposed in the cup with one end projecting outwardly of the cup beyond the rim, a cathode depolarizing mixture comprising manganese dioxide and carbon black moistened with an aqueous electrolyte, the said mixture being interposed between the inside of the cup and the carbon cathode below the rim of the cup, a washer of porous dielectric material encircling the carbon cathode out of contact with the cathode depolarizing mixture, the outer periphery of the washer being against the inside of the cup and the inner periphery against the carbon cathode, the said washer having a tab formed integrally therewith and projecting upwardly beyond the rim of the cup, and a moldable sealing compound molded in situ upon the outside of the washer forming a top seal for the cell between the sides of the carbon electrode and cup and encircling the said tab, said tab projecting through the sealing compound and forming a gas permeable passageway through the sealing compound for venting the hydrogen generated in the cell.

References Cited in the file of this patent

UNITED STATES PATENTS

| Number | Name | Date |
|---|---|---|
| 1,487,494 | Tyrrell | Mar. 18, 1924 |
| 1,624,455 | Yngve | Apr. 12, 1927 |
| 1,765,673 | Huntley | June 24, 1930 |
| 1,855,677 | Huntley | Apr. 26, 1932 |
| 2,343,194 | Lawson | Feb. 29, 1944 |
| 2,612,533 | Blake | Sept. 30, 1952 |

FOREIGN PATENTS

| Number | Country | Date |
|---|---|---|
| 503,905 | Great Britain | Apr. 17, 1939 |